US012573432B2

(12) United States Patent (10) Patent No.: US 12,573,432 B2
Wei et al. (45) Date of Patent: Mar. 10, 2026

(54) METHOD FOR AUDIOVISUAL SIGNAL SYNCHRONIZATION AND AUDIOVISUAL SYNCHRONIZATION PROCESSING SYSTEM

(71) Applicant: REALTEK SEMICONDUCTOR CORP., Hsinchu (TW)

(72) Inventors: Shih-Hua Wei, Hsinchu (TW); Yung-Jui Lee, Hsinchu (TW); Ting-Pang Tsao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 430 days.

(21) Appl. No.: 18/123,380

(22) Filed: Mar. 20, 2023

(65) Prior Publication Data

US 2023/0307005 A1 Sep. 28, 2023

(30) Foreign Application Priority Data

Mar. 22, 2022 (TW) .................................. 111110463

(51) Int. Cl.
*H04N 17/00* (2006.01)
*G11B 27/34* (2006.01)

(52) U.S. Cl.
CPC ............. *G11B 27/34* (2013.01); *H04N 17/00* (2013.01)

(58) Field of Classification Search
USPC ........................................................ 386/207
See application file for complete search history.

(56) References Cited

U.S. PATENT DOCUMENTS

| | | | | |
|---|---|---|---|---|
| 9,723,180 | B2 * | 8/2017 | McRae ............. | H04N 21/41265 |
| 10,985,850 | B1 * | 4/2021 | Ichapurapu ......... | H04W 56/001 |
| 2010/0111490 | A1 * | 5/2010 | Nakamura .............. | G11B 27/11 |
| | | | | 719/331 |
| 2012/0081385 | A1 * | 4/2012 | Cote .................... | G06V 40/162 |
| | | | | 345/589 |
| 2012/0081578 | A1 * | 4/2012 | Cote .................... | H04N 25/134 |
| | | | | 348/E5.024 |
| 2012/0167001 | A1 * | 6/2012 | Ortiz ................ | H04N 21/42224 |
| | | | | 715/781 |
| 2012/0268553 | A1 * | 10/2012 | Talukder ............. | H04L 65/1069 |
| | | | | 348/E7.083 |

(Continued)

FOREIGN PATENT DOCUMENTS

| | | |
|---|---|---|
| CN | 106060534 A | 10/2016 |
| CN | 110290411 A | 9/2019 |

*Primary Examiner* — Nigar Chowdhury
(74) *Attorney, Agent, or Firm* — Li & Cai Intellectual Property (USA) Office

(57) ABSTRACT

A method and a system for audiovisual signal synchronization are provided. The method is adapted to an audiovisual system. When the audiovisual system is in operation, a circuit for distributed audiovisual synchronization-calibration is provided for acquiring delay information reported by various audiovisual circuit modules that are in charge of processing audiovisual signals. Accordingly, the audiovisual synchronization processing system that is disposed in the audiovisual system to synchronize the audiovisual signals can obtain a time difference between audio signals and video signals. When processing audio and video data, the audiovisual system can utilize the time difference to synchronize the audio signals and the video signals, and then output an audiovisual content.

7 Claims, 4 Drawing Sheets

(56)          References Cited

U.S. PATENT DOCUMENTS

| | | | | |
|---|---|---|---|---|
| 2013/0106980 | A1* | 5/2013 | Obaidi | H04N 21/43072 |
| | | | | 348/14.02 |
| 2013/0162757 | A1* | 6/2013 | Kawamura | H04N 7/142 |
| | | | | 348/14.08 |
| 2015/0310891 | A1* | 10/2015 | Pello | G11B 20/10527 |
| | | | | 369/47.16 |
| 2016/0373615 | A1* | 12/2016 | Chen | H04N 21/43072 |
| 2017/0064154 | A1* | 3/2017 | Tseng | H04N 21/8547 |
| 2019/0116395 | A1* | 4/2019 | Kerdranvat | H04N 21/439 |
| 2020/0077128 | A1* | 3/2020 | Eden | H04N 21/2187 |
| 2022/0319553 | A1* | 10/2022 | Cheong | G11B 27/031 |
| 2023/0051068 | A1* | 2/2023 | Jo | H04R 1/10 |
| 2023/0164217 | A1* | 5/2023 | Longhurst | H04L 69/28 |
| | | | | 709/248 |

* cited by examiner

METHOD FOR AUDIOVISUAL SIGNAL SYNCHRONIZATION AND AUDIOVISUAL SYNCHRONIZATION PROCESSING SYSTEM

CROSS-REFERENCE TO RELATED PATENT APPLICATION

This application claims the benefit of priority to Taiwan Patent Application No. 111110463, filed on Mar. 22, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for synchronizing audiovisual signals, and more particularly to a method for audiovisual signal synchronization and an audiovisual synchronization processing system of which automatic delay compensation is performed via a preset lookup table.

BACKGROUND OF THE DISCLOSURE

An audiovisual system separately processes audio signals and video signals of audiovisual data received thereby. Two separate circuits and software programs are used to process these two types of signals since the audio signals and the video signals generally require different decoding/encoding and compression technologies. However, when the audio and video signals are finally synthesized and outputted, the audio and the video may be out of sync due to differences in the processing time spent by each of the circuits and the software programs over audio and video signal processing paths.

FIG. 1 is a circuit block diagram of a conventional audiovisual system, in which an audiovisual processing device 10 is provided. The main circuits of the audiovisual system include a data processing unit 101, an audio decoder 102, a video decoder 103, an audiovisual synchronizer (e.g., a centralized audiovisual synchronization-calibration module 105 as shown in the drawing), an audio output unit 106, a video output unit 107 and an output interface 108.

When the audiovisual processing device 10 receives audio and video data transmitted from an audio and video data source 11, the audio decoder 102 and the video decoder 103 respectively process the audio signals and the video signals in the audio and video data after the data processing unit 101 analyzes and processes the audio and video data. For example, the audio signals and the video signals can be decoded and decompressed according to the coding and compression technologies used in the audio and video data source 11. Then, the processed audio signals and the processed video signals are inputted to the centralized audiovisual synchronization-calibration module 105, and undergo a centralized synchronization process according to a time delay formed after processing of the audio signals and the video signals by the above-mentioned hardware and software.

In the conventional technology, a set of delays is set after querying of a lookup table according to the time delay for processing the audio signals and the video signals in the audiovisual processing device 10. When these signals are inputted to the centralized audiovisual synchronization-calibration module 105, the set of delays is applied to the audio signals and the video signals, and then the audio signals and the video signals are outputted to the output interface 108 via the audio output unit 106 and the video output unit 107, respectively. Finally, when the audio signals and the video signals are outputted via a specific audiovisual interface (such as HDMI and DisplayPort), synchronized audio can be outputted via a speaker 12, and synchronized video can be played on a display 13.

Conventionally, the video signals (e.g., television signals) are synchronized by a tester using a measurement instrument to adjust the delays occurring in the audio and the video. Due to various combinations of frame rates and audio codecs of different videos, the tester needs to spend a lot of time adjusting audiovisual synchronization parameters in order to establish a centralized table. In addition, there is difficulty in customizing, adjusting, and testing such a centralized table. Another synchronization method for digital television signals is achieved through time stamps in a bitstream. However, since the video signals and the audio signals are processed by two separate processes, the television signals may still be out of sync.

SUMMARY OF THE DISCLOSURE

When dealing with various audiovisual formats and processing techniques, the conventional technology fails to satisfy all the requirements of audiovisual synchronization by only providing fixed delay compensation based on a pre-measured time delay. In response to the above-referenced technical inadequacy, the present disclosure provides a method for audiovisual signal synchronization and an audiovisual synchronization processing system. The audiovisual synchronization processing system provides a distributed reporting mechanism that is used to collect delay information provided by main circuit modules (such as one or more audio processing circuits and one or more video processing circuits) of an audiovisual system, and then outputs a calibration value. The calibration value is utilized for performing automatic audiovisual delay compensation. Accordingly, the audiovisual system (such as a television system) can output an optimized and synchronized audiovisual content. The audiovisual synchronization processing system also allows engineers of the circuit modules of the audiovisual system to provide customized and fine-synchronization solution for the audiovisual system, such that customers can be provided with the best audiovisual experience.

According to one embodiment of the present disclosure, the audiovisual synchronization processing system is disposed in the audiovisual system, and is used to operate the method for audiovisual signal synchronization. When audio and video data is received, through a circuit for distributed audiovisual synchronization-calibration (which processes directly by hardware or by running a software/firmware thereon) in the audiovisual synchronization processing system, the delay information of the circuit modules in the audiovisual system can be collected. Specifically, one or more audio processing circuits that are used to process audio signals and one or more video processing circuits that are used to process video signals can report their respective delay time to the circuit for distributed audiovisual synchronization-calibration in real time. Afterwards, the audiovisual synchronization processing system calculates a time difference between the audio signals and the video signals according to the data reported by the modules. After an audio and video data processing procedure is performed, the audiovisual synchronization processing system utilizes the time difference to synchronize the audio signals and the video signals, and then outputs an audiovisual content. Accordingly, when the audiovisual system plays the audiovisual content, the audiovisual synchronization processing system can still receive new data and synchronize the audio signals and the video signals in real time if any change of the delay time occurring in a playback procedure is identified.

Further, after the audio and video data is processed by the audiovisual synchronization processing system, the time-compensated audio signals and the time-compensated video signals are separately generated, and then the audiovisual content is outputted via an audio output circuit and a video output circuit of the audiovisual system.

Still further, the above-mentioned one or more audio processing circuits used for processing the audio signals indicates one or more activated audio processing circuits (which can be hardware or software modules) on an audio processing path. Similarly, the one or more video processing circuits used for processing the video signals indicates one or more activated video processing circuits (which can be hardware or software modules) on a video processing path.

Preferably, in the method for audiovisual signal synchronization, the audio and video data is received after turning on an audiovisual device or switching to an audiovisual channel, and a processing circuit for audiovisual signal synchronization of the audiovisual synchronization processing system starts to check one or more than one of the hardware or software modules that is activated to process the audio signals and the video signals in the audio and video data.

Further, the circuit for distributed audiovisual synchronization-calibration also obtains a time for a digital signal processor of the audiovisual system to process the audio and video data in real time. The time is integrated into the delay information, so that the circuit for distributed audiovisual synchronization-calibration takes the time spent by the digital signal processor into account during calibration of the audio and video data.

In one further embodiment of the present disclosure, an audio and video sample can be used to obtain the delay information of each circuit module for processing the audio and video data. The circuit for distributed audiovisual synchronization-calibration collects the delay information and establishes a lookup table. The lookup table includes an audio processing time table and a video processing time table. The audio processing time table records a processing time of the one or more audio processing circuits for processing the audio signals. The video processing time table records processing time of the one or more video processing circuits for processing the video signals.

Further, in one embodiment, the lookup table is established in the audiovisual system. Firstly, the audio and video sample is prepared. Next, an audiovisual mark is inserted into the audio and video sample. Afterwards, based on the audiovisual mark, a processing time of each of the circuit modules (or the software modules) for processing the audio signals and the video signals on the audio processing path and the video processing path can be measured. For example, a system clock signal of the audiovisual system can be used for measuring the processing time of each of the circuit or software modules based on the audiovisual mark, thereby establishing the lookup table.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
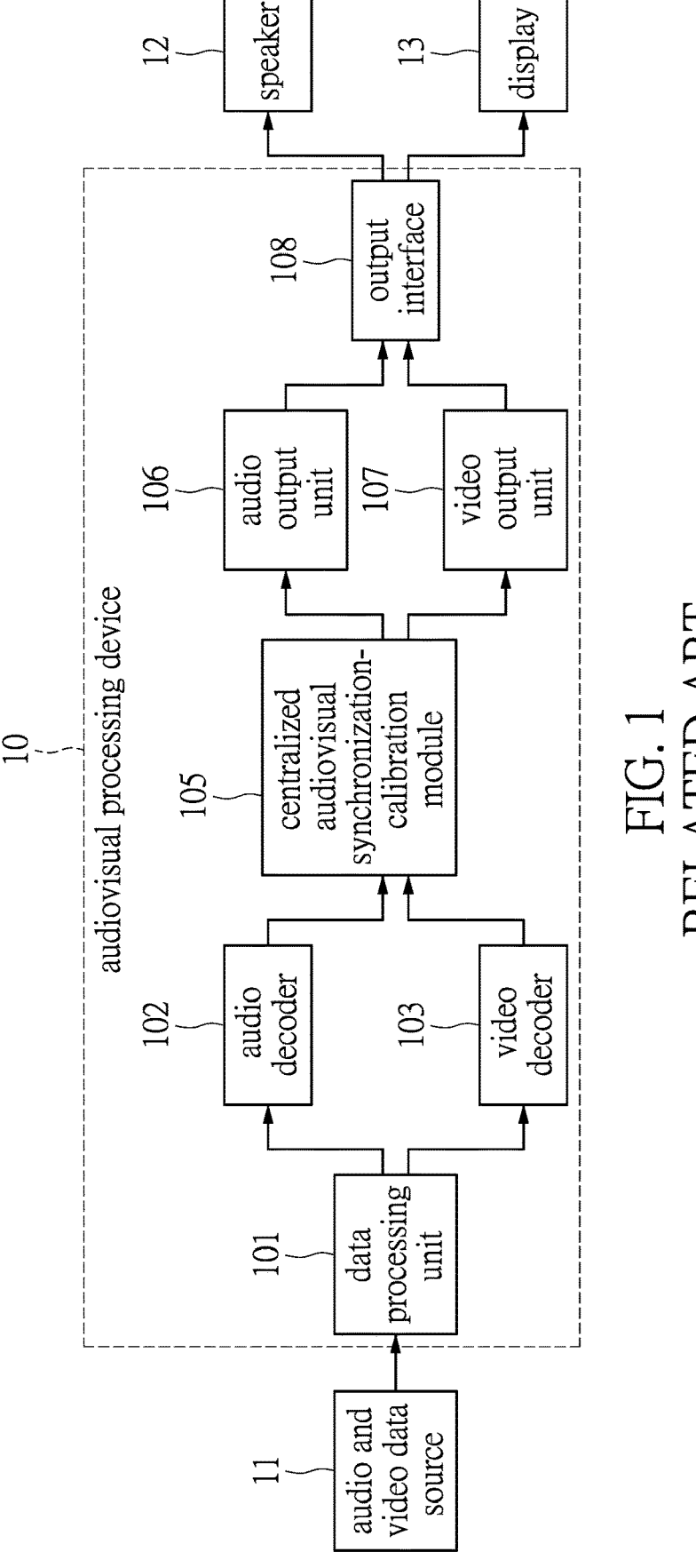
FIG. 1 is a circuit block diagram of a conventional audiovisual system.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

When dealing with more and more diversified audiovisual formats and processing techniques, the conventional method for audiovisual signal synchronization with fixed delay compensation can no longer satisfy the requirements of audio and video synchronization under various audio and video formats. Given that different formats of audio and video data require different processing methods, outputting stable and synchronized audio and video by an audiovisual system (e.g., a television system) that is already complicated can be even more difficult. The present disclosure provides a method for audiovisual signal synchronization and a system that is able to output better synchronized audio and video. Through the method, engineers who design circuit modules of the audiovisual system can provide customized settings for various audiovisual systems, so that a viewer can be provided with the best viewing experience.

Figure 3:
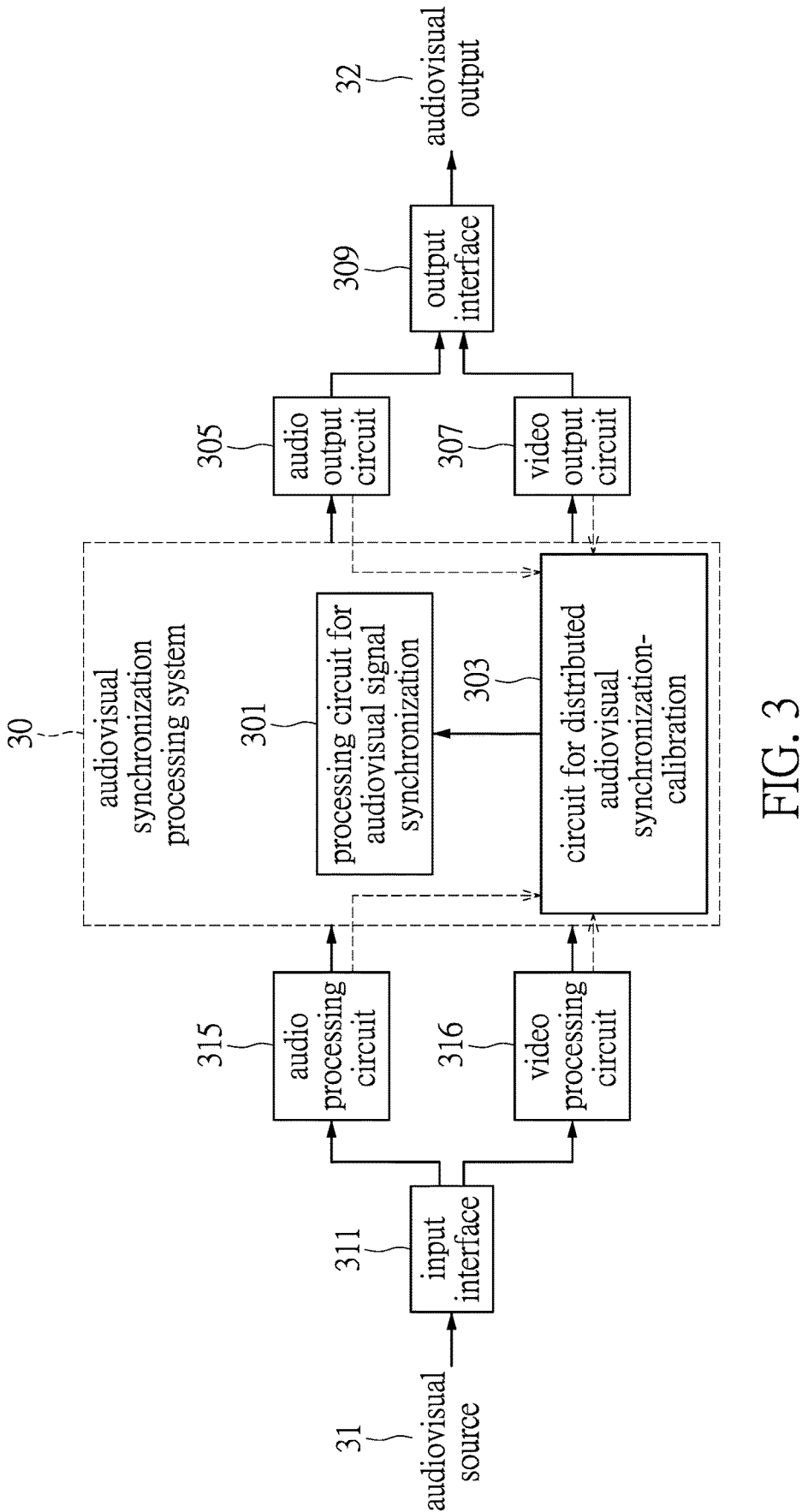
FIG. 3 is a schematic diagram of an audiovisual synchronization processing system that is applied to an audiovisual system according to one embodiment of present disclosure.
Figure 4:
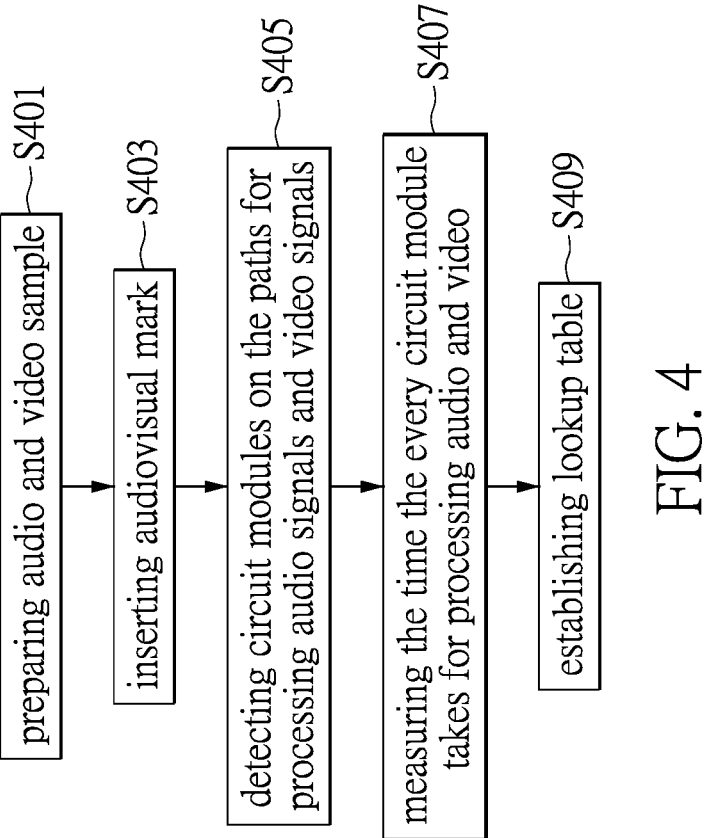
FIG. 4 is a flowchart illustrating a process of establishing a lookup table of an audio and video data processing circuit according to one embodiment of the present disclosure.

In the method for audiovisual signal synchronization provided by the present disclosure, a distributed reporting mechanism is provided in the audiovisual system. The audiovisual system can actively or passively collect delay information reported by main circuit modules when the system is in operation. The delay information can be used to obtain a calibration value that is utilized for performing automatic audiovisual delay compensation. According to one embodiment of the present disclosure, a circuit for distributed audiovisual synchronization-calibration in the audiovisual system can be implemented by means of software or by cooperation with hardware components. References are made to FIG. 2 and FIG. 3, which illustrate operations of the circuit for distributed audiovisual synchronization-calibration according to embodiments of the present disclosure. A lookup table is established for the circuit for distributed audiovisual synchronization-calibration to perform audiovisual synchronization. FIG. 4 is a flowchart illustrating a process of retrieving the delay information that corresponds to audio and video data processing circuits according to one embodiment of the present disclosure.

Figure 2:
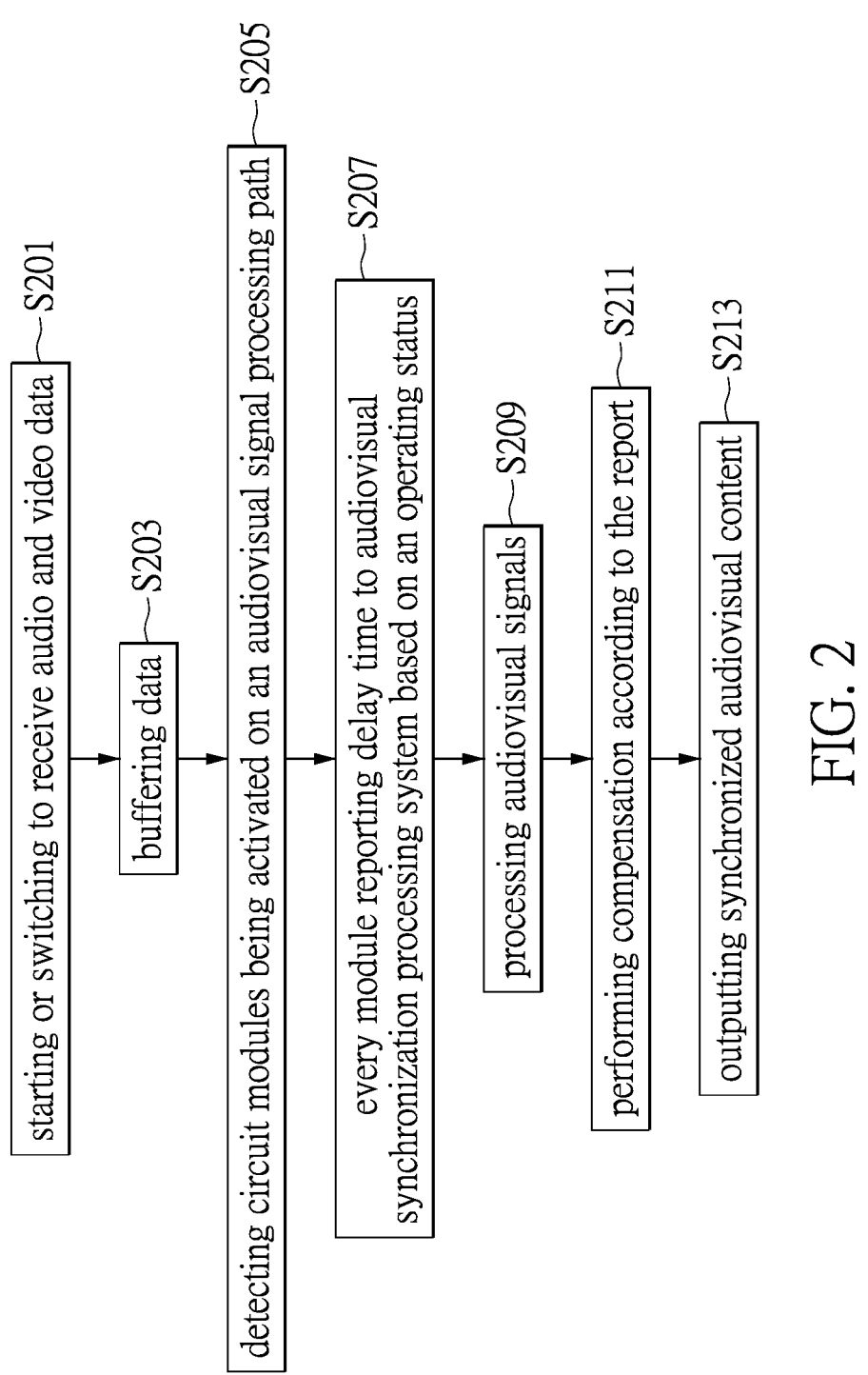
FIG. 2 is a flowchart illustrating a method for audiovisual signal synchronization according to one embodiment of the present disclosure.

Reference is made to FIG. 2, which is a flowchart illustrating a method for audiovisual signal synchronization that is adapted to an audiovisual system according to one embodiment of the present disclosure.

When the audiovisual system starts to receive audio and video data from an audiovisual source (step S201), the audiovisual system firstly buffers the audio and video data in a memory (step S203). According to one embodiment of the present disclosure, when a user manipulates an audiovisual device to select an audiovisual content listed in a playback menu or uses a computer or a television to switch to one of audiovisual channels, the audiovisual system starts to receive new audio and video data. During the time that the audio and video data is buffered, the audiovisual system analyzes the audio and video data via a digital signal processor (DSP) that can be, for example, the data processing unit 101 of FIG. 1. The audiovisual signals can be separated into audio signals and video signals. A processing circuit for audiovisual signal synchronization or running firmware or software on such hardware checks one or more circuit modules or software modules that are activated on an audiovisual signal processing path (step S205).

In one embodiment of the present disclosure, in the above step S205, one or more audio processing circuits that is used to process the audio signals can be obtained by checking the one or more audio processing circuits that are activated on an audio processing path by the processing circuit for audiovisual signal synchronization. Further, through the processing circuit for audiovisual signal synchronization, the one or more video processing circuits that is activated for processing the video signals on a video processing path can be obtained. In one embodiment of the present disclosure, the audiovisual system obtains the one or more circuit modules that are activated via a lookup table. For example, the lookup table is pre-established by the audiovisual system. The lookup table (such as Table 3 or Table 4) can be established through a flowchart as shown in FIG. 4.

The audio processing circuit or the video processing circuit can be hardware or software-implemented module. The processing circuit for audiovisual signal synchronization (as shown in FIG. 3) of the audiovisual system utilizes format data of the audio and video data to check the one or more hardware or software modules that is used to process the audio signals and the video signals in the audio and video data.

When the one or more audio processing circuits that is used to process the audio signals or the one or more video processing circuits that is used to process the video signals in the audiovisual system is determined, a distributed reporting mechanism provided by the audiovisual system receives the delay information reported by each of the modules according to operation status thereof. The distributed reporting mechanism can be achieved by a circuit for distributed audiovisual synchronization-calibration 303 of FIG. 3. The delay information can be reported to the circuit for distributed audiovisual synchronization-calibration 30 of FIG. 3. Further, in one embodiment of the present disclosure, the digital signal processor of the audiovisual system can be configured to report time for processing the audio and video data. An audiovisual synchronization processing system of the audiovisual system can be used to receive the delay information provided by the audio processing circuit, the video processing circuit or the digital signal processor. The delay information is used by the audiovisual system to obtain the time for processing the audio and video data by each of the circuit modules. The delay information that causes delay of the audiovisual system should be solved.

In an exemplary example, when the audiovisual system starts to play the audio and video data, the audiovisual synchronization processing system receives the delay information reported by the one or more audio processing circuits that is activated on the audio processing path via the distributed reporting mechanism, and then calculates time for processing the audio signals in the audiovisual system. In equation 1, "TotalTime" indicates the time to process the audio signals in the audiovisual system. In this example, the time ("aTime(i)") is spent by the audio processing circuit ("enAudioModule(i)") that is activated on the audio processing path to process the audio signals. The audio processing circuits ("enAudioModule(i)"), such as enAudioModule(1), enAudioModule(2), enAudioModule(3) to enAudioModule(m), spend time ("aTime(1), aTime(2), aTime(3) to aTime(m)") to process the audio signals. After that, a total time "aTotalTime" is obtained. Another way is to establish the lookup table in advance. By referring to the lookup table, the one or more audio processing circuits that is activated on the audio processing path can be obtained. Accordingly, the time for the each of the modules to process the audio signals in the audiovisual system can be calculated.

$$a\text{TotalTime}=(en\text{AudioModule}(1)*a\text{Time}(1))+(en\text{Au-}\\ \text{dioModule}(2)*a\text{Time}(2))+(en\text{AudioModule}(3)\\ *a\text{Time}(3))+\ldots+(en\text{AudioModule}(m)*a\text{Time}\\ (m)).\qquad\qquad\text{Equation 1:}$$

In equation 2 below, "vTotalTime" indicates time that the audiovisual system takes to process the video signals. The audiovisual synchronization processing system can obtain the time "vTime(j)" for each of the video processing circuits on the video processing path through the distributed reporting mechanism. The time for each of the video processing circuits can be indicated by "vTime(1)", "vTime(2)", "vTime(3)" and "vTime(n)" that are respectively taken by "enVideoModule(1)", "enVideoModule(2)", "enVideoModule(3)" and "enVideoModule(m)" in Equation 2. After that, a total time "vTotalTime" for processing the audio signals can be calculated.

$$vTotalTime = (enVideoModule(1)*vTime(1)) + (enVideoModule(2)*vTime(2)) + (enVideoModule(3)*vTime(3)) + \ldots + (enVideoModule(n)*vTime(n)). \quad \text{Equation 2:}$$

As mentioned above, the total time "aTotalTime" for processing the audio signals by the audiovisual system can be calculated. In Equation 2, the total time "vTotalTime" for processing the video signals by the audiovisual system can also be calculated. After that, equation 3 is used to calculate a difference between "vTotalTime" and "aTotalTime", so as to obtain a time difference "diffTime" when the audiovisual system processes the audio signals and the video signals at the same time. The time difference "diffTime" denotes the delay information reported by the circuit modules of the audiovisual system via the distributed reporting mechanism (step S207).

$$diffTime = vTotalTime - aTotalTime. \quad \text{Equation 3:}$$

Further, in order to provide customized viewing experiences, a set of offset time ("offsetTime") is further defined in the method for audiovisual signal synchronization, and is provided for a manufacturer or a user of the audiovisual system to adjust the time difference of the equations according to practical requirements. For example, in Equation 4, the time difference ("diffTime") obtained in Equation 3 is added to the offset time ("offsetTime"). The time difference can be adjusted as a positive value or a negative value, and then a final result of compensation time is obtained.

$$result = diffTime + offsetTime. \quad \text{Equation 4:}$$

In an exemplary example, if the compensation time is larger than 0 (i.e., result >0), the audio signals are delayed or the video signals are configured to be advanced over the audio signals. Conversely, if the compensation time is smaller than 0 (i.e., result <0), the video signals are delayed or the audio signals are configured to be advanced over the video signals. Therefore, the method for audiovisual signal synchronization can be applied to a complicated audiovisual system for providing a more flexible and more precise delay compensation effect.

Therefore, in continuation of the process shown in FIG. 2, after the audiovisual signals are processed by the audiovisual system (step S209), the compensation can be performed based on the time difference (or with the offset time) derived by the audiovisual synchronization processing system through the delay information reported by each of the circuit modules (step S211). Finally, a synchronized audiovisual content is outputted (step S213).

A system that operates the above-mentioned method for audiovisual signal synchronization can be applied to a specific audiovisual system. The audiovisual synchronization processing system can be a circuit system that is implemented by circuits and software. The audiovisual system can be embodied as an audiovisual device exemplarily shown in FIG. 3, which illustrates operating processes of circuit components of the system.

The audiovisual device includes an audiovisual synchronization processing system 30. The main components of the audiovisual synchronization processing system 30 include a processing circuit for audiovisual signal synchronization 301 that can be implemented by circuits, firmware or software of the audiovisual synchronization processing system 30, so as to operate the method for audiovisual signal synchronization. The audiovisual synchronization processing system 30 also includes a circuit for distributed audiovisual synchronization-calibration 303 that can be implemented by software or by cooperation with hardware components, so as to report the delay information in a distributed manner.

In the audiovisual system, an input interface 311 is used to receive the audio and video data in a specific format from an audiovisual source 31. The method for audiovisual signal synchronization can be triggered when new audio and video data is received after turning on the audiovisual device or switching to another audiovisual channel whilst watching an audiovisual content. The processing circuit for audiovisual signal synchronization 301 then starts to check one or more hardware and/or software modules that is used to process the audio signals and video signals in the audio and video data.

In the present embodiment of the present disclosure, after an initial process, the audio signals are processed by an audio processing circuit 315. The video signals are processed by a video processing circuit 316. The audio processing circuit 315 and the video processing circuit 316 are circuits and software modules that perform signal conversion, decoding, decompression, and noise reduction with respect to the audio signals and the video signals of a specific format. A processing path for processing the audio signals and the video signals is formed. The processing path can be changed according to practical requirements. The audiovisual synchronization processing system 30 of the audiovisual system is able to check the one or more audio processing circuits and the video processing circuits on the processing path according to the format of the audio and video data. Through the distributed reporting mechanism provided by the audiovisual synchronization processing system 30, the circuit for distributed audiovisual synchronization-calibration 303 is able to perform delay compensation according to the delay information reported by the one or more circuit modules.

According to one embodiment of the present disclosure, when the audiovisual system receives the audio and video data, the audiovisual synchronization processing system 30 is in charge of audio and video synchronization. The circuit for distributed audiovisual synchronization-calibration 303 obtains the delay information from an input end and an output end of each of the circuit modules. The delay information contains time spent for processing the input audio and video data by the audio processing circuit 315 and the video processing circuit 316, time spent for processing output audio signals in real time by an audio output circuit 305 at an output end thereof, and time spent for processing output video signals in real time by a video output circuit 307. The delay information is reported to the circuit for distributed audiovisual synchronization-calibration 303. Furthermore, the circuit for distributed audiovisual synchronization-calibration obtains the time for processing the audio and video data in real time by a digital signal processor of the audiovisual system. The time spent by the digital signal processor is also collected into the obtained delay information. The time spent by the digital signal processor is therefore taken into account when the audio and video data is calibrated. In this way, the circuit for distributed audiovisual synchronization-calibration 303 can obtain the delay time that is collected from the information reported by each of the circuit modules that are in operation in the audiovisual system, and then calculate the time difference shown in Equation 3. The output audio and video signals can be calibrated in real time.

According to the above embodiment of the present disclosure, after the audiovisual synchronization processing system 30 processes the audio and video data, the time-compensated audio signals and the time-compensated video signals are separately formed. Referring to the method for audiovisual signal synchronization illustrated in FIG. 2 and the equations 3 and 4, the time-compensated audio signals and the time-compensated video signals are outputted by the audio output circuit 305 and the video output circuit 307, respectively. An output audio and video 32 is then formed at an output interface 309.

In another aspect, the distributed reporting mechanism of the circuit for distributed audiovisual synchronization-calibration can establish a lookup table according to the delay information reported by each of the circuit modules since the delay formed by each of the circuit modules is generally a fixed value or has little change in value. The lookup table acts as a reference for the delay compensation. Reference is made to FIG. 4, which is a flowchart illustrating a process of establishing a lookup table of an audio and video processing circuit according to one embodiment of the present disclosure.

In the process, an audio and video sample is inputted to the audiovisual system (step S401). The audio and video sample can be, for example, a clip of an audiovisual content that can be processed by various encoding and compression methods. An audiovisual mark can be inserted into the audio and video sample (step S403). The audio and video sample is then inputted to the audiovisual system that has yet to establish the lookup table. The audiovisual system can be, for example, a television or a set-top box system.

Next, a hardware circuit or a software module in the audiovisual system (such as the processing circuit for audiovisual signal synchronization) is used to check the one or more circuit modules that are used to process the audio signals and the video signals on the processing path (step S405). The circuit for distributed audiovisual synchronization-calibration of the audiovisual system is used to measure the time that every circuit module takes for processing audio and video (step S407). In one embodiment of the present disclosure, a system clock signal of the audiovisual system can be used for measuring processing time of each of the circuit or software modules for processing the audio and video sample on the audio or video processing path based on the audiovisual mark. Accordingly, the circuit for distributed audiovisual synchronization-calibration can establish the lookup table (step S409). The circuit for distributed audiovisual synchronization-calibration is able to obtain the delay information according to the processing time reported by each of the modules. The lookup table is used to record the delay information. Therefore, when the audio and video data is calibrated in the audiovisual system, processing time for processing the audio and video signals in real time on their respective processing paths can also be taken into account. Finally, the purpose of synchronizing the audio and the video can be achieved.

In one embodiment of the present disclosure, the above-mentioned lookup table includes an audio processing time table and a video processing time table. The audio processing time table records the processing time of the one or more audio processing circuits for processing the audio signals. The video processing time table records the processing time of the one or more video processing circuits for processing the video signals.

The audiovisual system generally includes various software and hardware modules. The different audio and video data has different audio processing paths and video processing paths based on their specific coding technologies. The method for audiovisual signal synchronization provided by the present disclosure measures the time spent by each of the software and hardware modules on the audio processing path and the video processing path. Table 1 and Table 2 show exemplary examples of the time spent by the modules on the processing paths.

TABLE 1

| audio processing time table | | | | |
|---|---|---|---|---|
| audio module(1) | audio module(2) | audio module(3) | . . . | audio module(i) |
| audio time | aTime(1) | aTime(2) | aTime(3) | . . . | aTime(i) |

The "audio module(i)" can denote the audio processing circuit. The audio time denotes the time spent by the audio processing circuit for processing the audio signals. The "aTime(i)" denotes the time for processing the audio signals by each of the audio processing circuits. For example, the audio processing time table records "audio module(1)", "audio module(2)", "audio module(3)", and "audio module (i)" and the time (i.e., "aTime(1)", "aTime¬(2)", "aTime(3)" and "aTime¬(i¬)") that are respectively spent for processing the audio signals.

TABLE 2

| video processing time table | | | | |
|---|---|---|---|---|
| video module(1) | video module(2) | video module(3) | . . . | video module(j) |
| video time | vTime(1) | vTime(2) | vTime(3) | . . . | vTime(j) |

The "video module(j)" can denote the video processing circuit. The video time denotes the time spent by the video processing circuit for processing the video signals. The "vTime(j)" denotes the time for processing the video signals by each of the video processing circuits. For example, the video processing time table records "video module(1)", "video module(2)", "video module(3)" and "video module (i)" and their corresponding time "vTime(1)", "vTime(2)", "vTime(3)" and "vTime(i)." Thus, after querying the lookup table (e.g., Table 1 and Table 2) according to the one or more audio processing circuits and the one or more video processing circuits that are in operation on the processing paths, the time difference between the time for processing the audio signals by the one or more audio processing circuits and the time for processing the video signals by the one or more video processing circuits can be calculated. The audiovisual system can synchronize the audio signals and the video signals based on the time difference, and then output the audiovisual content.

Further, in the method for audiovisual signal synchronization, the circuit and/or software modules that are activated on the audio processing path and the video processing path can be checked by means of software or hardware. The circuit and/or software modules that are activated on the processing paths can be identified by referring to the lookup table. Table 3 and Table 4 show the exemplary examples.

TABLE 3

| lookup table for activated audio processing circuits. | | | | |
|---|---|---|---|---|
| | audio module(1) | audio module(2) | audio module(3) | . . . | audio module(i) |
| audio path | enAudio Module(1) | enAudio Module(2) | enAudio Module(3) | . . . | enAudio Module(i) |

The "audio module(i)" shown in Table 3 denotes the audio processing circuit designed on the audio processing path. The "enAudioModule(i)" denotes the audio processing circuit to be activated on the audio processing path.

In the example shown in FIG. 3, the "enAudioModule(i)" denotes the audio processing circuit to be activated on the audio processing path. The audio processing circuit is the circuit or software module that is used to process the audio signals on the audio processing path, and the audio processing circuit can be a signal sampling circuit, a conversion circuit for digital-to-analog conversion or analog-to-digital conversion, an encoding/decoding circuit, a decompression circuit, a filtering circuit and an equalization circuit.

TABLE 4

| lookup table for activated video processing circuit. | | | | |
|---|---|---|---|---|
| | video module(1) | video module(2) | video module(3) | . . . | video module(j) |
| video path | enVideo Module(1) | enVideo Module(2) | enVideo Module(3) | . . . | enVideo Module(j) |

The "video module(j)" shown in Table 4 denotes the video processing circuit designed on the video processing path. The "enVideoModule(j)" denotes the video processing circuit to be activated on the video processing path.

In the example shown in Table 4, the "enVideoModule(j)" denotes the video processing circuit to be activated on the video processing path. The video processing circuit is the circuit or the software module that is used to process the video signal on the video processing path. The video processing circuit can be a signal sampling circuit, a conversion circuit for digital-to-analog conversion or analog-to-digital conversion, an encoding/decoding circuit or a decompression circuit.

In summation, in the method for audiovisual signal synchronization and the audiovisual synchronization processing system provided by the present disclosure, the distributed reporting mechanism can be implemented by the method. The software and/or hardware-implemented circuit for distributed audiovisual synchronization-calibration can acquire in real time the delay information reported by each of the circuit modules in the audiovisual system. The delay information can further include the processing time of the digital signal processor in the audiovisual system. The delay information provided to the audiovisual system can be obtained, and the audiovisual system can perform synchronization and calibration based on the delay information whilst processing the audio and video data. In addition, the method for audiovisual signal synchronization can satisfy the need of customization for various audiovisual systems. The audiovisual synchronization processing system can provide the viewer with a viewing experience that is without audio and video offset.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for audiovisual signal synchronization, which is adapted to an audiovisual system, comprising:
   receiving audio and video data after turning on an audiovisual device or switching to an audiovisual channel;
   collecting, by a circuit for distributed audiovisual synchronization-calibration of the audiovisual system in a distributed manner, delay information provided by one or more audio processing circuits that are activated on an audio processing path and is used to process audio signals in the audiovisual system and one or more video processing circuits that are activated on a video processing path and is used to process video signals in the audiovisual system, wherein, a processing circuit for audiovisual signal synchronization of the audiovisual system checks one or multiple ones of the one or more audio processing circuits and the one or more video processing circuits that is activated to process the audio signals and the video signals in the audio and video data;
   calculating a time difference between the audio signals and the video signals in the audio and video data according to the delay information; and
   performing an audio and video data processing procedure to calibrate the audio signals and the video signals, and outputting an audiovisual content after synchronizing the audio signals and the video signals according to the time difference;
   wherein the delay information obtained by the circuit for distributed audiovisual synchronization-calibration is used to establish a lookup table, which includes an audio processing time table that records a processing time of the one or more audio processing circuits for processing the audio signals, and a video processing time table that records a processing time of the one or more video processing circuits for processing the video signals;
   wherein the lookup table is established by steps of:
      preparing an audio and video sample;
      inserting an audiovisual mark into the audio and video sample;
      measuring, based on the audiovisual mark, the processing time of the one or more audio processing circuits and the processing time of the one or more video processing circuits for processing the audio signals and the video signals of the audio and video sample on the audio processing path and the video processing path, respectively; and
      establishing the lookup table.

2. The method according to claim 1, wherein the circuit for distributed audiovisual synchronization-calibration further obtains, in real time, a time for a digital signal processor of the audiovisual system to process the audio and video data, and the time is integrated into the delay information, so that the circuit for distributed audiovisual synchronization-calibration takes the time spent by the digital signal processor into account during calibration of the audio and video data.

3. The method according to claim 1, wherein a system clock signal of the audiovisual system is used to measure the processing time of each of the one or more audio processing circuits or the one or more video processing circuits based on the audiovisual mark.

4. An audiovisual synchronization processing system, which is disposed in an audiovisual system, comprising:

a processing circuit for audiovisual signal synchronization; and a circuit for distributed audiovisual synchronization-calibration;

wherein the processing circuit for audiovisual signal synchronization operates a method for audiovisual signal synchronization, and the method includes:

receiving audio and video data after turning on an audiovisual device or switching to an audiovisual channel;

collecting, by the circuit for distributed audiovisual synchronization-calibration in a distributed manner, delay information provided by one or more audio processing circuits that are activated on an audio processing path and is used to process audio signals in the audiovisual system and one or more video processing circuits that are activated on a video processing path and is used to process video signals in the audiovisual system, wherein, the processing circuit for audiovisual signal synchronization of the audiovisual system checks one or multiple ones of the one or more audio processing circuits and the one or more video processing circuits that is activated to process the audio signals and the video signals in the audio and video data according to format data of the audio and video data according to format data of the audio and video data;

calculating time difference between the audio signals and the video signals in the audio and video data according to the delay information; and performing an audio and video data processing procedure to calibrate the audio signals and the video signals, and outputting, by the audiovisual system, an audiovisual content after synchronizing the audio signals and the video signals according to the time difference;

wherein the delay information obtained by the circuit for distributed audiovisual synchronization-calibration is used to establish a lookup table, which includes an audio processing time table that records a processing time of the one or more audio processing circuits for processing the audio signals, and a video processing time table that records a processing time of the one or more video processing circuits for processing the video signals;

wherein the lookup table is established by steps of:

preparing an audio and video sample;

inserting an audiovisual mark into the audio and video sample;

measuring, based on the audiovisual mark, the processing time of the one or more audio processing circuits and the processing time of the one or more video processing circuits for processing the audio signals and the video signals of the audio and video sample on the audio processing path and the video processing path, respectively; and establishing the lookup table.

5. The audiovisual synchronization processing system according to claim 4, wherein, after the audio and video data is processed by the audiovisual synchronization processing system, the time-compensated audio signals and the time-compensated video signals are separately generated, and then the audiovisual content is outputted via an audio output circuit and a video output circuit of the audiovisual system.

6. The audiovisual synchronization processing system according to claim 4, wherein the circuit for distributed audiovisual synchronization-calibration further obtains a time to process the audio and video data by a digital signal processor of the audiovisual system in real time, and the time is integrated into the delay information for the circuit for distributed audiovisual synchronization-calibration to additionally consider the time spent by the digital signal processor when calibrating the audio and video data.

7. The audiovisual synchronization processing system according to claim 4, wherein the audiovisual system relies on a system clock signal and the audiovisual mark to measure the processing time of each of the circuit or software modules.

* * * * *